May 29, 1945.  R. B. COTTRELL  2,377,212

ACCELEROMETER

Filed Dec. 30, 1943  2 Sheets-Sheet 1

INVENTOR.
Robert B. Cottrell

May 29, 1945.　　　R. B. COTTRELL　　　2,377,212
ACCELEROMETER
Filed Dec. 30, 1943　　　2 Sheets-Sheet 2

INVENTOR.
Robert B. Cottrell
BY
　　　Atty.

Patented May 29, 1945

2,377,212

UNITED STATES PATENT OFFICE 2,377,212

ACCELEROMETER

Robert B. Cottrell, Chicago, Ill., assignor to American Steel Foundries, Chicago, Ill., a corporation of New Jersey Application December 30, 1943, Serial No. 516,175

6 Claims. (Cl. 264—1)

My invention relates to a measuring device and more particularly to an instrument for measuring movements or changes in velocity of a movable object, such an instrument being commonly known as an accelerometer.

The general object of my invention is to design an accelerometer in which a mass is suspended from a frame by means of a plurality of tension straps, each strap being provided with a device, such as a strain gauge, for measuring changes in the tension thereof due to relative movement between the mass and the frame.

A further object of my invention is to design an accelerometer such as above described in which the tension straps are connected to the mass at substantially the center of gravity thereof.

Figure 1:
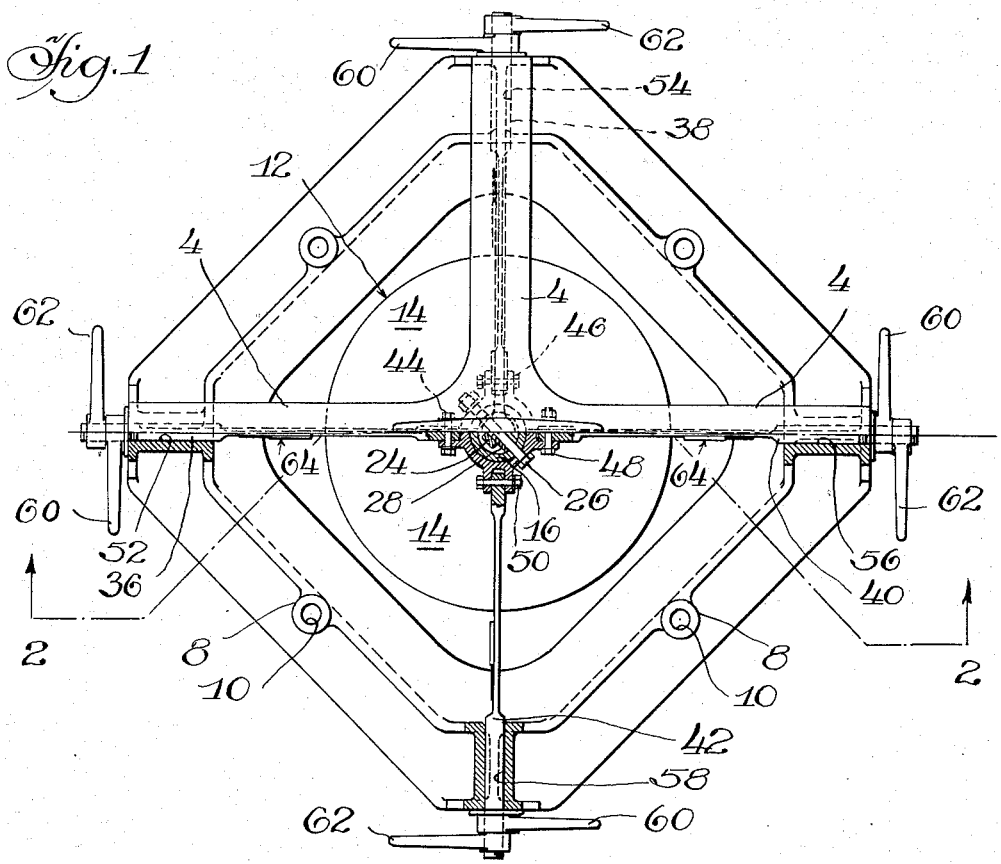
Figure 1 is a top view of my novel accelerometer, the upper half of Figure 1 being a top plan view and the lower half thereof being a sectional view with portions of the structure shown in section along the plane indicated by the line 1—1 of Figure 2.
Figure 2:
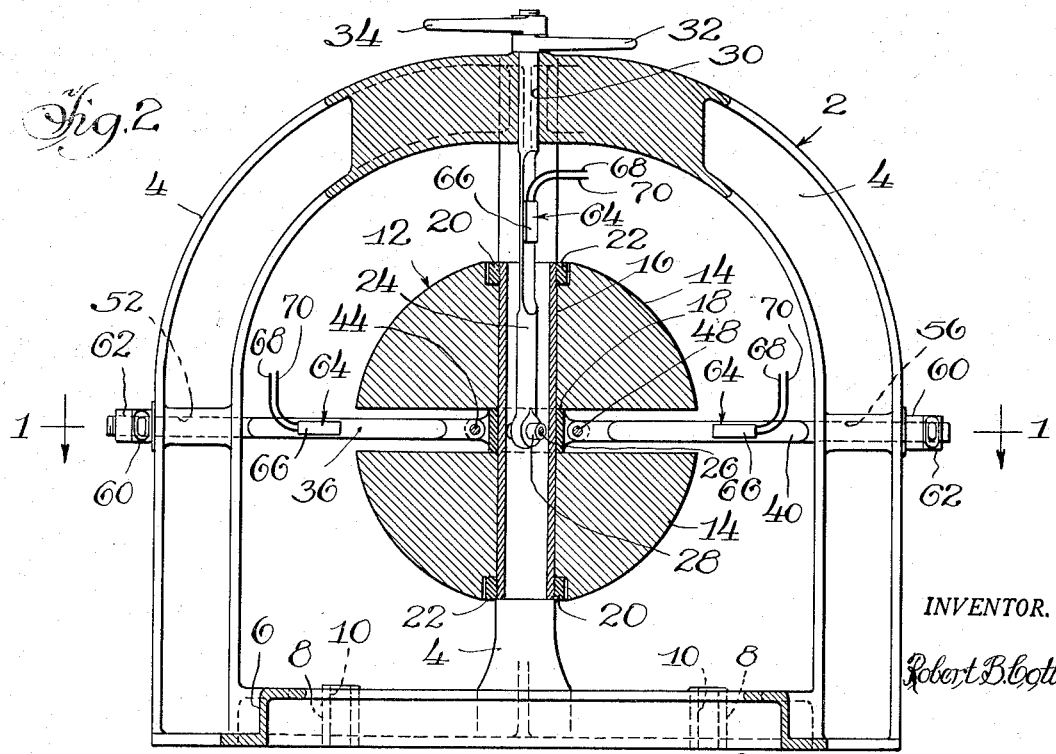
Figure 2 is a sectional view taken in the planes indicated by the line 2—2 of Figure 1.

Describing my invention in detail and referring first to the embodiment illustrated in Figures 1 and 2, the frame, generally designated 2, comprises four columns 4, 4, joining each other at their upper extremities and merging at their lower extremities with a base 6 affording a seat for the accelerometer upon an associated moving object, said base being provided with spaced bosses 8, 8 and openings 10, 10 therethrough for the reception of any convenient securing means, such as bolts, whereby said frame may be secured to the moving object.

Suspended centrally of said frame is a mass, generally designated 12, consisting of a pair of spaced semispheres 14, 14 mounted on a sleeve 16 extending through central aligned openings in the members 14, 14 and passing through the center of gravity of the mass 12. Mounted on the sleeve 16 is a collar or spider 18 against which the semispheres 14, 14 are maintained by means of nuts 20, 20 threaded on opposite ends of the sleeve 16, said nuts being received within recesses 22, 22 formed in the respective members 14, 14.

A vertical strap 24 is connected at its lower end to the sleeve 16 by means of a bolt and nut assembly 26 having a suitable bushing 28, the upper end of said strap passing through an opening 30 in the frame and being adjustably secured thereto by means of an adjusting nut 32 and a lock nut 34 in threaded engagement with the upper end of said strap 24.

Four horizontal straps, 36, 38, 40 and 42 are pivotally connected at their corresponding ends as at 44, 46, 48 and 50, respectively, to the spider 18, and the opposite corresponding ends of said straps project respectively through openings 52, 54, 56 and 58 formed in the frame for threaded engagement with adjusting nuts 60, 60 and lock nuts 62, 62 by means of which each strap may be placed under adjustable tension.

Each strap is provided with an electric strain gauge 64, and it will be understood by those skilled in the art that the strain gauge consists of a loop of extremely fine wire fixed to the strap by means of a piece of cloth or paper indicated at 66, current being passed through this loop by means of two leads 68 and 70. Thus, as the tension of the strap varies, the resistance of the strain gauge wire also varies and is registered on a recording instrument, such as an oscilloscope, connected to the leads 68 and 70. The strain gauge 64 is of conventional form and is therefore not illustrated in detail in the present application.

It will be understood that the mass 12 is suspended within the frame 2 by means of the straps 24, 36, 38, 40 and 42, each of said straps being adjustably tensioned by means of the associated adjusting nut 60. Thus, vertical movement of the mass 12 with respect to the frame 2 is registered by means of the strain gauge associated with the vertical strap 24, some registration being recorded by the strain gauges associated with the other straps. Movement of the mass 12 to the right or left, as seen in Figure 1, will be primarily registered by the strain gauges associated with the straps 36 and 40 with some registration on the strain gauges associated with the other three straps and movement of the mass 12 to the top or bottom, as seen in Figure 1, will be primarily registered by the strain gauges associated with the straps 38 and 42, some registration being afforded by the other three straps. It will be understood that by a process of calibration it can readily be determined to what extent movement in each direction is recorded by the various strain gauges and thus, when the device is in operation, movements or changes in velocity of the moving object to which the frame 2 is attached may be determined by means of my novel accelerometer.

The connection of the strap 24 to the sleeve 16 is at the center of gravity of the mass 12 and, likewise, the connection of each strap 36, 38, 40 and 42 to the spider 18 is closely adjacent the center of gravity of the mass, and it will be understood that inasmuch as there is a concentration of the weight of the mass at the center of gravity thereof, this arrangement is of considerable significance in affording delicate response of the device to movements of the object to which the frame 2 is attached.

Figure 3:
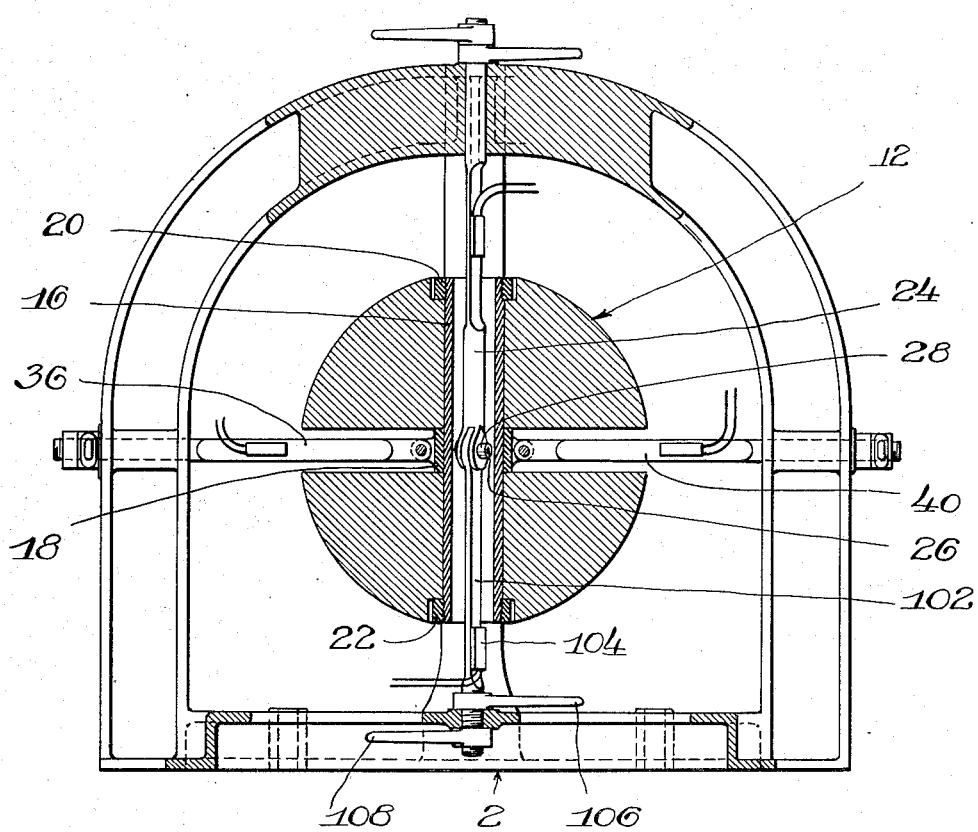
Figure 3 is a sectional view comparable to Figure 2, but illustrates a modification of my invention.

Referring now to Figure 3, the accelerometer illustrated therein is substantially identical with that shown in Figures 1 and 2, except for the addition of a lower vertical tension strap 102 disposed in opposed relationship with respect to the upper vertical tension strap 24. The lower strap is provided with a strain gauge 104, an adjusting nut 106 and a locking nut 108. It will be understood that the provision of the lower strap 102 facilitates adjustment of the tension on the strap 24 and also affords additional registration of vertical movements of the mass 12 by means of the strain gauge 104.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. A device including a frame, a mass consisting of two spaced semispheres joined by a sleeve extending through the center of gravity of said mass, a spider mounted on said sleeve between said spaced semispheres, two pairs of horizontal straps connected to said spider and said frame, a vertical strap connected to said frame and to said sleeve at substantially the center of gravity of said mass mass, strain gauges on said straps for measuring changes in the tension thereof, and means on each strap for adjustably varying the tension thereof.

2. A device including a frame, a mass consisting of two spaced semispheres joined by a sleeve extending through the center of gravity of said mass, a spider mounted on said sleeve intermediate said spaced semispheres, two pairs of horizontal tension straps connected to said spider and said frame, upper and lower vertical tension straps connected to said frame and connected to said sleeve at substantially the center of gravity of said mass, and strain gauges on said straps for measuring changes in the tension thereof.

3. A device including a frame, a mass consisting of two spaced semispheres joined by a sleeve extending through the center of gravity of said mass, a spider mounted on said sleeve between said spaced semispheres, two pairs of horizontal straps connected to said spider and said frame, a vertical strap connected to said frame and to said sleeve at substantially the center of gravity of said mass, and means for registering changes in the tension of said straps.

4. A device including a frame, two pairs of horizontally disposed tension straps, a substantially vertical strap, a mass suspended by said straps, and means for indicating changes in the tension of said straps, all of said straps being connected to said mass at substantially the center of gravity thereof.

5. A device including a frame, a mass suspended therein by means of a plurality of tension straps connected to said mass and adjustably connected to said frame, and means associated with each strap for indicating changes in the tension thereof, the connection of said straps to said mass being at approximately the center of gravity thereof.

6. A device including a frame, a mass supported from said frame and relatively movable with respect thereto, a tension strap connected to said mass and said frame, and means for indicating changes in the tension of said strap.

ROBERT B. COTTRELL.